May 12, 1959
R. J. EHRET
2,886,754
PUSH-PULL MOTOR DRIVE CIRCUIT
Filed March 24, 1955
2 Sheets-Sheet 1
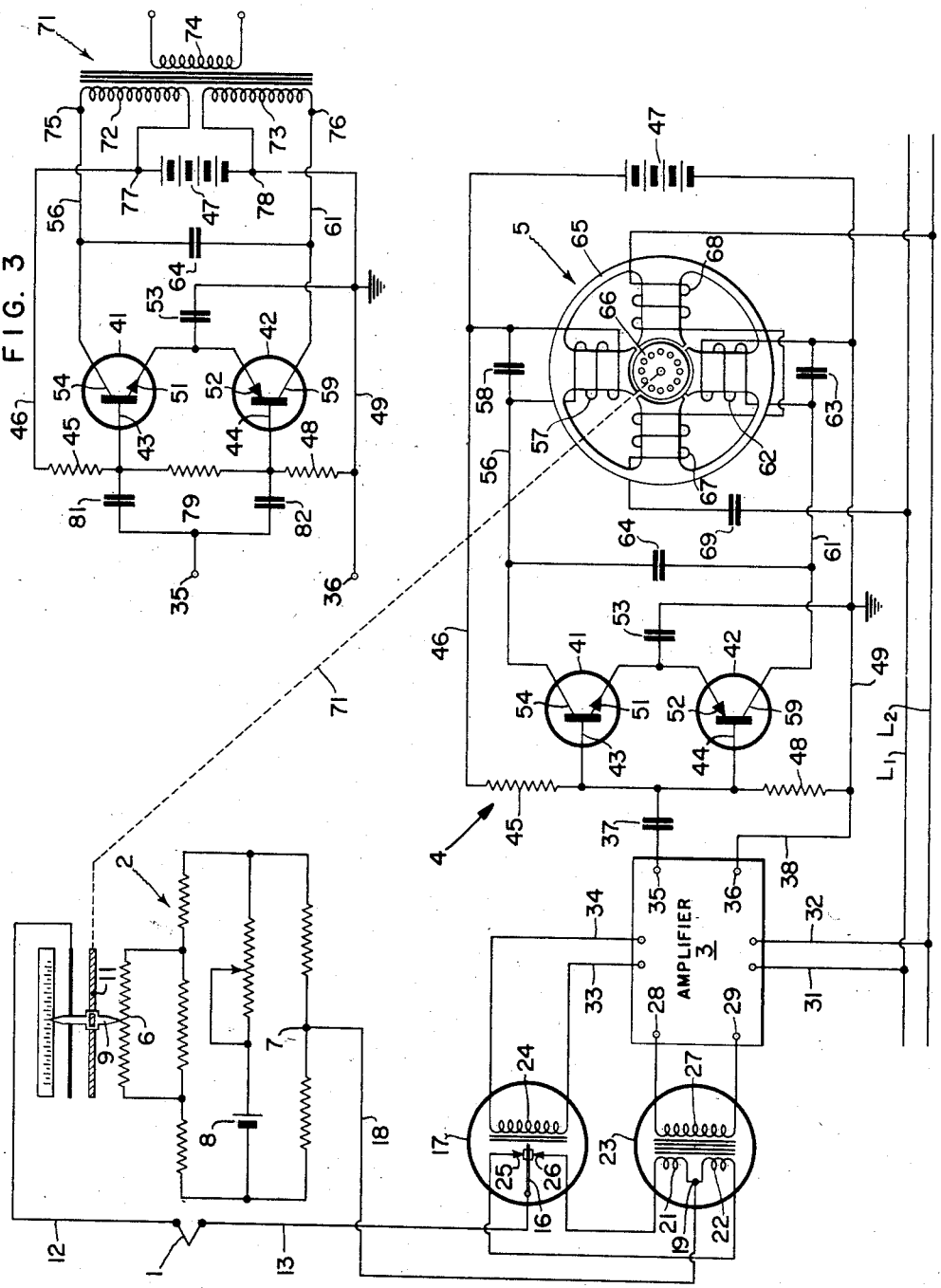
INVENTOR.
ROBERT J. EHRET
BY
*Henry L. Hanson*
ATTORNEY.

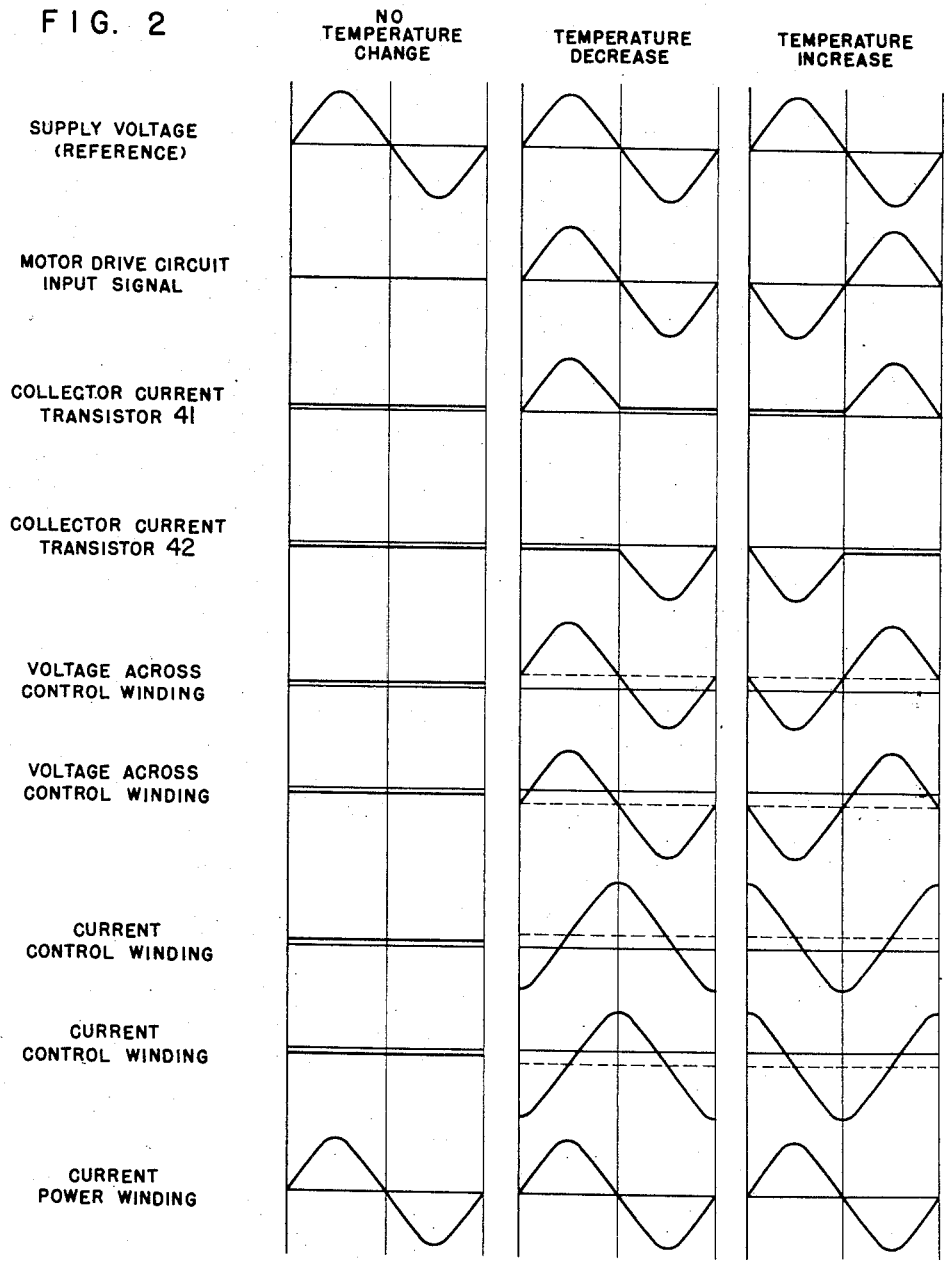

United States Patent Office 2,886,754
Patented May 12, 1959

2,886,754

PUSH-PULL MOTOR DRIVE CIRCUIT

Robert J. Ehret, Philadelphia, Pa., assignor to Minneapolis-Honeywell Regulator Company, Minneapolis, Minn., a corporation of Delaware Application March 24, 1955, Serial No. 496,420

10 Claims. (Cl. 318—29)

A general object of the present invention is to provide a new and improved electronic output circuit. More specifically, the present invention is concerned with a push-pull output circuit employing transistors as its amplifying elements.

A specific object of the present invention is to provide a new and novel push-pull output circuit utilizing the principle of complementary symmetry which achieves a push-pull output without a phase inverting stage.

Another object of the present invention is to provide a transistorized push-pull output circuit employing the principle of complementary symmetry wherein the transistors, connected in the common emitter configuration, are energized from a single grounded power supply.

The present invention is particularly adapted for use as a motor drive circuit for a two-phase reversible induction motor of the type employed in a self-balancing measuring and controlling apparatus. In one form of such apparatus, a measuring circuit unbalance is amplified by means of an electronic amplifier which is operative to impress upon the input of a motor drive circuit a signal, varying in magnitude and phase, in accordance with the magnitude and direction of the unbalance. The motor drive circuit, in turn, operates in accordance with the magnitude and phase of that signal to selectively energize the motor for rotation in the direction and to the extent necessary to rebalance the measuring circuit.

Accordingly, a further specific object of the present invention is to provide a motor drive circuit, employing transistors as its amplifying elements, which is capable of delivering the power necessary to effectively drive a rebalancing motor in an apparatus of the type described.

A still further object of the present invention is to provide a stabilized transistor motor drive circuit.

The various features of novelty which characterize this invention are pointed out with particularity in the claims annexed to and forming part of this specification. For a better understanding of the invention, its advantages, and the specific objects attained with its use, reference should be had to the accompanying drawings and descriptive matter in which are illustrated and described preferred embodiments of this invention.

Of the drawings:

Fig. 1 is a circuit diagram of a preferred embodiment of the present invention employed as a motor drive circuit;

Fig. 2 is a table showing voltages and currents present in different parts of the circuit shown in Fig. 1 under various operating conditions; and Fig. 3 is a circuit diagram of a preferred embodiment of the present invention adapted for general use as a push-pull output circuit.

Referring now to the drawings, Fig. 1 shows an embodiment of the present invention employed in a self-balancing potentiometer which is adapted for measuring the output of the thermocouple 1. In this apparatus, changes in the output of the thermocouple 1 unbalance the measuring circuit 2. This unbalance is amplified by means of an electronic amplifier 3 which is operative to impress upon the input of the motor drive circuit 4 a signal, varying in magnitude and phase, in accordance with the magnitude and direction of the unbalance. The motor drive circuit 4, in turn, operates selectively, in accordance with the phase and magnitude of the signal, to energize the rebalancing motor 5, driving it in the direction and to the extent necessary to rebalance the measuring circuit 2.

The measuring circuit 2 comprises two resistive branch circuits connected in parallel across an energizing circuit. The energizing circuit includes a source of unidirectional voltage shown here as the battery 8. One of the two resistive branch circuits includes the slidewire resistor 6 and the other resistive branch circuit includes the circuit point 7 between a pair of resistors connected in series with one another. A sliding contact 9 engages the slidewire 6 and is adjustable along the length of the latter by the rotation of the adjusting element 11.

The thermocouple 1 is connected by means of the conductor 12 to the sliding contact 9 and is connected by means of the conductor 13 to the polarized vibrating reed 16 of the converter 17.

The terminal point 7 is connected by the conductor 18 to the common terminal 19 of the primary winding sections 21 and 22 of the input transformer 23. The converter 17 includes a winding 24 energized by alternating current to cause the polarized vibrating reed 16 to vibrate with the frequency of the alternating current impressed on the winding 24. As the reed 16 vibrates back and forth, under the influence of the winding 24, it alternately engages the contacts 25 and 26. The contact 25 is connected to the end terminal of the primary winding section 22 of the input transformer 23. The contact 26 is connected to the end terminal of the primary winding section 21 of the input transformer 23.

The input transformer 23 has a secondary winding 27 which is connected to the input terminals 28 and 29 of the amplifier 3. The amplifier 3 is energized from a suitable source of alternating current, the conductors $L_1$ and $L_2$, by means of the leads 31 and 32. The amplifier 3 is operative, through the leads 33 and 34, to energize the winding 24 of the converter 17 in phase with the voltage across the conductors $L_1$ and $L_2$.

The motor drive circuit 4 is coupled to the output terminals 35 and 36 of the amplifier 3 by means of the coupling capacitor 37 and the conductor 38, respectively. The motor drive circuit 4 employs the transistors 41 and 42 as its amplifying elements. The transistor 41 is an n-p-n junction type transistor and the transistor 42 is a p-n-p junction type transistor. Both of these transistors have the usual emitter, collector, and base electrodes.

The base 43 of the transistor 41 and the base 44 of the transistor 42 are connected to the coupling condenser 37. The base 43 of the transistor 41 is connected through the resistor 45 and the conductor 46 to the positive terminal of a suitable source of direct current, shown here as the battery 47. Similarly, the base 44 of the transistor 42 is connected through the resistor 48 and the conductor 49 to the negative terminal of the battery 47 which is connected to ground. The emitter 51 of the transistor 41 and the emitter 52 of the transistor 42 are connected together and to ground through the capacitor 53. The collector 54 of the transistor 41 is connected through the conductor 56 and the motor control winding section 57 to the conductor 46. The capacitor 58 is connected in parallel with the motor control winding section 57. Similarly, the collector 59 of the transistor 42 is connected through the conductor 61 and the motor control winding section 62 to the conductor 49. The capacitor 63 is connected in parallel across a motor control winding section 62. The capacitors 58 and 63 are selected with respect to the motor control winding sections 57 and 62 so as to form therewith substantially parallel resonant circuits at the frequency of motor operation. The capacitor 64 is connected between the conductors 56 and 61 and thus is connected across the battery 47 through the motor control winding sections 57 and 62.

The motor 5 is a two-phase reversible induction motor and includes, in addition to the motor control winding sections 57 and 67, a stator 65 having four salient pole pieces, a squirrel cage rotor 66, and two power winding sections 67 and 68. The motor control winding sections 57 and 62 are wound on two of the opposing pairs of pole pieces and the power winding sections 67 and 68 are wound on the remaining pair of opposing pole pieces. The power winding sections 67 and 68 are connected in series with the capacitor 69 across the suitable source of alternating current, the conductors $L_1$ and $L_2$. The capacitor 69 is selected with respect to the motor power winding sections 67 and 68 so as to form therewith a substantially series resonant circuit at the frequency of the current on the conductors $L_1$ and $L_2$. The rotor 66 of the rebalancing motor 5 is operative through the linkage 71 and adjusting element 11 to position the sliding contact 9 along the length of the slidewire resistor 6 of the measuring circuit 2.

In considering the operation of the motor drive circuit 4, the relative values of certain of the circuit components are of importance. The resistors 45 and 48 have equal resistances and constitute a base voltage stabilizing divider connected in series across the battery 47. The capacitor 53 is connected to the mid point of a voltage divider formed by the motor control winding section 58, the collector-emitter circuit of the transistor 41, the emitter-collector circuit of the transistor 42, and the motor control winding section 62. The capacitance of the capacitor 53 is made sufficiently large so that it will not lose an appreciable charge during any half cycle of operation and thus it will have a charge such that its voltage will be one half that of the battery 47. Since the voltage on the capacitor 53 will be one half that of the battery 47 the emitter-collector bias of the transistor 41 will be one half of voltage of the battery 47. Similarly, the emitter-collector bias of the transistor 42 will also be one half of the voltage of the battery 47.

The capacitor 64 is connected in shunt across the battery 47 through the motor control winding sections 57 and 62 and thus becomes charged to approximately the voltage of the battery 47. In circuit operation, the capacitor 64 serves to tie the motor control winding section 57 of the motor control winding section 62 so they operate in parallel. It should be noted that, if there is sufficient coupling between the motor control winding sections 57 and 62, the capacitor 64 could be eliminated.

For the purposes of this explanation, the voltage across the conductors $L_1$ and $L_2$ will be considered as the reference voltage. The direction of the rotation of the two-phase reversible induction motor 5 depends upon the phase relationship between the current in the motor power winding sections 67 and 68 and the current in the motor control winding sections 57 and 62. If the current in the control winding sections leads the current in the power winding sections by approximately 90°, the motor 5 will turn in one direction. If, on the other hand, the current in the control winding sections lags the current in the power winding sections by approximately 90° the motor 5 will turn in the other direction. As shown, the motor power winding sections 67 and 68 are connected in series with the condenser 69 across the alternating current conductors $L_1$ and $L_2$. In operation, the power winding sections are continuously energized by current from the conductors $L_1$ and $L_2$. As a result of the series resonant circuit formed by the condenser 69 in the power winding sections 67 and 68, the current in the power winding sections is substantially in phase with the voltage across the conductors $L_1$ and $L_2$. Due to the parallel resonant circuit formed by the capacitors 58 and 63 and the motor control winding sections 57 and 62, respectively, the current flowing in the control winding sections lags the voltage across these sections by approximately 90°.

When the measuring apparatus of Fig. 1 is unbalanced by a change in the output voltage of the thermocouple 1, current is caused to flow in the circuit comprising the thermocouple 1, the conductor 13, the vibrating reed 16, the contacts 25 and 26, the input transformer primary winding sections 21 and 22, the conductor 18 and the bridge circuit connected between the slidewire contact 9 and the terminal point 7. When such unbalance occurs, the balancing motor 5 is energized for rotational operation and adjusts the slider contact 9 in the direction and to the extent necessary to restore the equality of the voltages of the thermocouple and the potential drop of the bridge circuit between the point 7 and the slidewire point engaged by the slider 9. While the apparatus is unbalanced the direction of the flow of current through the thermocouple is in one direction or the other as the thermocouple voltage exceeds or is less than the voltage drop in the bridge circuit between the point 7 and the slider contact 9.

When the current flows through the thermocouple circuit, the operation of the converter 17 causes current pulses to flow alternately through the transformer primary winding sections 21 and 22. When the voltage unbalance is in one direction, the current pulses pass through each of the winding sections 21 and 22 toward the common terminal 19 and the conductor 18. When the unbalance is in the opposite direction, the current flow through each of the winding sections 21 and 22 is in a direction away from the common terminal 19. The alternating current induced to the transformer secondary winding 27 is in phase or 180° out of phase with the current flowing in the energizing coil 24 of the converter 17, depending on the construction of the apparatus. The phase of the current induced in the winding 27 is reversed, or shifted 180°, by reversal of the direction of the current flow through the transformer winding sections 21 and 22.

The voltage of one phase or the opposite phase induced in the transformer secondary winding 24 is amplified by the electronic amplifier 3. The amplifier 3, in turn, is operative to amplify this alternating current signal and impress it upon the input of the motor drive circuit 4.

Referring now to Figure 2, there is a table showing voltages and currents present in different parts of the motor drive circuit 4 of Fig. 1 under various operating conditions. When no current flows through the thermocouple circuit, indicating no temperature change, there is no alternating current signal impressed upon the input of the motor drive circuit 4. Because the transistors 41 and 42 are biased for zero emitter base voltage, there is very little current flowing through the motor control winding sections 57 and 62 in the absence of an input signal. For the purpose of this explanation, it has been assumed that a temperature decrease will cause the motor drive circuit input signal to be in phase with the reference voltage. Thus, when there is a temperature decrease, the base electrodes 43 and 44 of the transistors 41 and 42 respectively are positive with respect to the emitters 51 and 52 during the first half cycle of the line voltage under consideration. The positive signal on the base of the transistor 41 will cause the collector current of the transistor 41 to increase thus making the potential of the collector electrode 54 of the transistor 41 more negative. This will permit current to flow from the battery 47 through the motor control winding section 57, the conductor 56, the collector emitter circuit of the transistor 41, and the condenser 53, to the negative terminal of the battery 47. During this same half cycle, the positive signal on the base 44 of the transistor 42 will cause the collector current of transistor 42 to decrease. However, due to the action of the condenser 64, a current will flow in the winding section 62 in a direction toward the condenser 64.

During the next half cycle of the control signal, the base electrodes 43 and 44 of the transistors 41 and 42 respectively, will be negative with respect to the emitters 51 and 52. This will cause the collector current of the transistor 42 to increase and current will flow from the capacitor 53 through the emitter collector circuit of the transistor 42, the conductor 61, and the motor control winding section 62 to the grounded plate of the capacitor 53. During this same half cycle the negative signal on the base 43 of the transistor 41 will cause the collector current of that transistor to decrease. However, due to the action of the capacitor 64, current will flow in the motor control winding section 57 toward the condenser 64. As a result of the action of the capacitors 58 and 63 connected in parallel with the motor control winding sections 57 and 62, respectively, the current through these motor control winding sections appears as 60 cycle alternating current which lags the current through the motor power winding sections 67 and 68 by approximately 90°. This causes the rebalancing motor 5 to adjust the slider contact 9 in the direction and to the extent necessary to restore the equality of the voltages of the thermocouple and the potential drop of the bridge circuit between the point 7 and the slidewire point engaged by the slider 9.

When there is a temperature increase, the base electrodes 43 and 44 of the transistors 41 and 42 respectively are negative with respect to the emitters 51 and 52 during the first half cycle of the line voltage under consideration. This will cause the collector current of the transistor 42 to increase and current will flow from the capacitor 53 through the emitter collector circuit of the transistor 42, the conductor 61, and the motor control winding sections 62 to the grounded plate of the capacitor 53. During this same half cycle the negative signal on the base 43 of the transistor 41 will cause the collector current of that transistor to decrease. However, due to the action of the capacitor 64, the current will flow in the motor control winding section 57 toward the condenser 64.

During the next half cycle of the control signal, the base electrodes 43 and 44 of the transistors 41 and 42 respectively, will be positive with respect to the emitters 51 and 52. The positive signal on the base of the transistor 41 will cause the collector current of that transistor to increase thus making the potential of the collector electrode 54 to become more negative. This will permit current to flow from the battery 47 to the motor control winding section 57, the conductor 56, the collector emitter circuit of the transistor 41, and the condenser 53, to the negative terminal of the battery 57. During this same half cycle, the positive signal on the base 44 of the transistor 42 will reduce that transistor's collector current. However, due to the action of the condenser 64, current will flow in the winding section 62 in a direction toward the condenser 64. As a result of the action of the capacitor 64 and the cooperation of the capacitors 58 and 63, connected in parallel to the motor control winding sections 57 and 62 respectively, the current flow through these motor control winding sections appears as a 60 cycle alternating current which leads the current through the motor power winding sections 67 and 68 by approximately 90°. This causes the motor 5 to adjust the slider contact 9 in a direction and to the extent necessary to restore the equality of the voltages of the thermocouple and the potential drop of the bridge circuit between the point 7 and the slidewire point engaged by the slider 9.

The circuit configuration of Fig. 1 permits the utilization of the principle of complementary symmetry to its fullest extent. While the symmetrical properties of transistors eliminated the need for a phase inverting circuit to achieve push-pull operation, prior art circuits require two power supplies or at best a single floating supply for energization.

With the circuit configuration just described, it is possible to achieve push-pull operation from a transistor circuit employing complementary symmetry, wherein the transistors, connected in the common emitter configuration, are energized from a single grounded power supply. In addition, the circuit is temperature stable. If the emitter current of the transistor 41 tries to increase, the emitter 51 goes more positive and cuts down the emitter current. Conversely, if the emitter current of the transistor 42 tries to increase, the emitter 52 tends to grow more negative which will reduce emitter current flow.

By way of illustration, the following list of components is typical for the embodiment of the invention shown in Fig. 1 and provides a highly practical and economical motor drive circuit.

Resistors 45 and 48 _____ohms__ 100,000
Capacitor 37 _____mfd__ 25
Capacitor 53 _____mfd__ 500
Capacitor 64 _____mfd__ 30
60 cycle impedance of the tuned motor control
 windings _____ohms__ 100
Battery 47 _____volts__ 45
Transistor 41 _____ Experimental
Transistor 42 _____ 2N57

Referring now to Fig. 3, there is shown a circuit diagram of a preferred embodiment of the present invention adapted for general use as a push-pull output circuit. Similar reference characters have been employed to designate corresponding components of Fig. 1 and these components will not be discussed in detail. The operation of the circuit of the present invention is not restricted to the "class B" mode shown in Fig. 1. Accordingly, a biasing resistor 79 has been included in the base stabilizing voltage divider of Fig. 3. The input of this circuit thus includes the two coupling capacitors 81 and 82. The resistance of the resistor 79 can be selected to provide a suitable operating bias.

The output of the circuit shown in Fig. 3 is taken from the output transformer 71 having two primary winding sections 72 and 73 and a secondary winding 74. As shown, the collector 54 of the transistor 41 is connected by means of the conductor 56 to the end terminal 75 of the primary winding section 72. Similarly, the collector 59 of the transistor 42 is connected by means of the conductor 61 to the end terminal 76 of the primary winding section 73. The end terminal 77 of the primary winding section 72 is connected to the positive terminal of the battery 47 and the end terminal 78 of the primary winding section 73 is connected to the negative terminal of the battery 47. The base 43 of the transistor 41 is connected by means of the resistor 45 and the conductor 46 to the positive terminal of the battery 47 as in Fig. 1. Similarly, the base 44 of the emitter 42 is connected by means of the resistor 45 and the conductor 49 to the negative terminal of the battery 47.

The circuit of Fig. 3 operates in a manner similar to that of the circuit of Fig. 1 with the effect of the bias supplied by the resistor 79 being dependent upon the size of that resistor. In this circuit, the primary winding sections 72 and 73 of the transformer 71 replace the motor control winding sections 57 and 62 of Fig. 1. As in the circuit of Fig. 1, the circuit of Fig. 3 provides a push-pull output from a circuit employing complementary symmetry wherein the transistors, connected in the grounded emitter configuration, are energized from a single grounded power supply. It should be noted that the condenser 64 of Figs. 1 and 3 can be eliminated if the inductive coupling between the equal load sections is sufficient to cause these sections to operate in parallel.

While, in accordance with the provisions of the statutes, there have been illustrated and described the best forms of the embodiments of the invention now known, it will be apparent to those skilled in the art that changes may be made in the forms of the apparatus disclosed without departing from the spirit of the invention as set forth in the appended claims, and that in some instances certain features of the invention may be used to advantage without a corresponding use of other features.

Having now described this invention, what is claimed as new and for which it is desired to secure by Letters Patent is:

1. A push-pull output circuit comprising in combination a pair of transistors of opposite conductivity types, each of said transistors having an emitter, a collector, and a base electrode, a pair of terminals adapted to be connected to an energizing source, a load circuit having two portions, the collector electrode of one transistor being connected through one portion of the load circuit to one of said pair of terminals, the collector electrode of the other transistor being connected through the other portion of the load circuit to the other of said pair of terminals, the emitter electrodes of both of said transistors being connected together and connected through a capacitor, sufficiently large so that it will retain substantially all its charge during the alternate half cycles of circuit operation, to one of said pair of terminals, and an input circuit connected to the base electrodes of both of said transistors and the last named terminal.

2. A push-pull output circuit employing as its amplifying elements a pair of transistors of opposite conductivity types, each of said transistors having an emitter, a collector, and a base electrode, a load circuit having two sections, an energy source having two terminals, the collector of one of said transistors being connected through one section of said load to one terminal of said source, the collector of the other of said transistors being connected through the other section of said load to the other terminal of said source, the emitter electrodes of both of said transistors being connected together and connected through a large capacitor to one terminal of said source, a resistive voltage divider connected across said source, the base electrodes of both of said transistors being connected to said voltage divider, and an input circuit connected to said voltage divider and to the last named terminal of said energy source.

3. A push-pull output circuit employing as its amplifying elements a pair of transistors of opposite conductivity types, each of said transistors having an emitter, a collector, and a base electrode, a current responsive load having two sections, a single energizing source, the collector of one of said transistors being connected through one section of the load to one terminal of the energizing source, the collector of the other transistor being connected through the other section of the load to the other terminal of the energizing source, the base electrodes of both transistors being connected together and to the mid point of a voltage divider connected across the energizing source, the emitters of both transistors being connected together, and a large capacitance connecting both of said emitters to one terminal of said energizing source.

4. An output circuit comprising in combination a pair of transistors of opposite conductivity types, each of said transistors having an emitter, a collector, and a base electrode, a current responsive load having two sections, a direct current source having two terminals, the collector of one of said transistors being connected through a first section of said load to one terminal of said direct current source, the collector of the other transistor being connected through the second section of the load to the second terminal of the direct current source, the base electrodes of both of said transistors being connected to a resistive voltage divider connected across the terminals of said direct current source, the emitters of both of said transistors being connected together, and a capacitor having a large capacitance connecting said emitters to one terminal of said direct current source.

5. A push-pull output circuit comprising in combination an npn junction type transistor, a pnp junction type transistor, a load having two sections, a direct current source, the collector electrode, of the npn transistor being connected through one portion of said load to the positive terminal of said direct current source, the collector electrode of the pnp transistor being connected through the other section of said load to the negative terminal of said direct current source, a voltage divider connected across said direct current source, the base electrodes of both of said transistors being connected to said voltage divider, the emitter electrodes of both of said transistors being connected together, and a large capacitor connecting the emitters of both of said transistors to the negative terminal of said direct current source.

6. An electronic motor drive circuit comprising in combination a pair of transistors of opposite conductivity types, each of said transistors having an emitter, a collector, and a base, a two-phase reversible induction motor having a fixed phase winding and two reversible phase windings, said fixed phase winding being adapted to be connected to a source of alternating current, a direct current power supply, the collector of each of said transistors being connected through separate ones of said two reversible phase windings to opposite terminals of said power supply, the base of each of said transistors being connected through equal resistors to the terminal of said power supply to which the transistor collector is connected, first circuit means connecting the emitters of both of said transistors together, a condenser connecting said emitters to one terminal of said power supply, and an input circuit connected to said last mentioned power supply terminal and to the base of both of said transistors.

7. A push-pull motor drive circuit comprising in combination a pair of transistors of opposite conductivity types, each of said transistors having an emitter, a collector, and a base electrode, an energy source having two terminals, a two-phase reversible induction motor having a power winding and a two section control winding, the collector electrode of each of said transistors being connected through separate sections of said control windings to opposite terminals of said power supply, the emitter electrodes of both of said transistors being connected together and connected through a large capacitor to one terminal of said energy source, and an input circuit connected to the base electrodes of both of said transistors and the last named terminal of said energy source.

8. A push-pull motor drive circuit comprising in combination an npn junction type transistor, a pnp junction type transistor, each of said transistors having an emitter, a collector, and a base electrode, a direct current source having two terminals, a two-phase reversible induction motor having a power winding and a two section control winding, said power winding being adapted to be connected to a source of alternating current, the collector electrode of the npn transistor being connected through one section of said motor control winding to the positive terminal of said direct current source, the collector electrode of the pnp transistor being connected through the other section of said motor control winding to the negative terminal of said direct current source, a voltage divider connected across said direct current source, the base electrodes of both of said transistors being connected to said voltage divider, and a capacitor having a large capacitance connecting the emitters of both of said transistors to the negative terminal of said direct current source.

9. Apparatus as specified in claim 8 wherein a condenser is connected between the collector electrode of said transistor.

10. A measuring system comprising in combination a rebalanceable electrical network, means for producing an alternating current in said network in phase or 180° out of phase with a reference voltage, an amplifier connected to said network for amplifying network unbalance, a motor drive circuit connected to the output of said amplifier, said motor drive circuit comprising in combination an npn junction type transistor, a pnp junction type transistor, each of said transistors having an emitter, a collector, and a base electrode, a direct current source having two terminals, a voltage divider connected across said direct current source, the base electrode of both of said transistors being connected to said voltage divider, and a capacitor having a large capacitance connecting the emitters of both of said transistors to the negative terminal of said current source, and a reversible two-phase induction motor having a power winding and a two section control winding, said power winding being adapted to be connected through a condenser to said source of reference voltage, the collector electrode of the npn transistor being connected through one section of said motor control winding to the positive terminal of said direct current source, the collector electrode of the pnp transistor being connected to the other section of said motor control winding to the negative terminal of said direct current source, said motor being connected to said rebalanceable electrical network for rebalancing said network.

References Cited in the file of this patent

UNITED STATES PATENTS

| | | |
|---|---|---|
| 2,666,818 | Shockley | Jan. 19, 1954 |
| 2,666,819 | Raisbeck | Jan. 19, 1954 |
| 2,692,359 | Ehret | Oct. 19, 1954 |
| 2,762,870 | Sziklai et al. | Sept. 11, 1956 |
| 2,791,645 | Bessey | May 7, 1957 |

OTHER REFERENCES

Sziklai Article, Pro. of I.R.E., June 1953, pp. 717–720.